United States Patent
Connell et al.

(10) Patent No.: US 12,379,759 B2
(45) Date of Patent: Aug. 5, 2025

(54) TRUE LOAD DISCONNECT RESET OF COMPUTING DEVICES

(71) Applicant: Google LLC, Mountain View, CA (US)

(72) Inventors: Nathan Connell, Chicago, IL (US); Juha Joonas Oikarinen, Los Gatos, CA (US); Badhri Jagan Sridharan, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/554,720

(22) PCT Filed: Feb. 24, 2022

(86) PCT No.: PCT/US2022/070816
§ 371 (c)(1),
(2) Date: Oct. 10, 2023

(87) PCT Pub. No.: WO2022/256755
PCT Pub. Date: Dec. 8, 2022

(65) Prior Publication Data
US 2024/0211010 A1    Jun. 27, 2024

Related U.S. Application Data

(60) Provisional application No. 63/195,373, filed on Jun. 1, 2021.

(51) Int. Cl.
*G06F 1/26*            (2006.01)
(52) U.S. Cl.
CPC ..................... *G06F 1/26* (2013.01)
(58) Field of Classification Search
CPC ........................................................ G06F 1/26
See application file for complete search history.

(56) References Cited

U.S. PATENT DOCUMENTS 8,078,893 B2 * 12/2011 Umedu .................. G06F 1/325
                                                       713/320
9,524,007 B2 * 12/2016 Rosik ............... G01R 31/31704
(Continued)

FOREIGN PATENT DOCUMENTS

CN        107171456 B        8/2020
EP         1596270 A1       11/2005
(Continued)

OTHER PUBLICATIONS

Analogic Tech et al., "AAT1230 18V 100mA Step-Up Converter", downladed Oct. 9, 2023, 21 pp.
(Continued)

*Primary Examiner* — Jaweed A Abbaszadeh
*Assistant Examiner* — Ayman Fatima
(74) *Attorney, Agent, or Firm* — Shumaker & Sieffert, P.A.

(57) ABSTRACT

An example method includes, responsive to determining that a button of a mobile computing device has been pressed for longer than a first amount of time, resetting a power management integrated circuit (PMIC); responsive to determining that the button of the mobile computing device has been pressed for longer than a second amount of time that is longer than the first amount of time, electrically disconnecting, at a first time, power sources from the mobile computing device; and electrically reconnecting, at a second time that is after the first time, the power sources to the mobile computing device.

17 Claims, 3 Drawing Sheets

(56) References Cited

U.S. PATENT DOCUMENTS

| | | | |
|---|---|---|---|
| 2013/0103935 A1 | 4/2013 | Maddigan | |
| 2015/0220123 A1 | 8/2015 | Rosik et al. | |
| 2020/0103955 A1* | 4/2020 | Lee | G06F 1/3293 |

FOREIGN PATENT DOCUMENTS

| | | |
|---|---|---|
| EP | 2642390 A1 | 9/2013 |
| GB | 2472051 A | 1/2011 |
| JP | 2019109625 A | 7/2019 |
| WO | 2016032525 A1 | 3/2016 |

OTHER PUBLICATIONS

Android, "Soft Restarts", retrieved from: https://source.android.com/docs/core/runtime/soft-restart, last updated Aug. 23, 2023, 6 pp.

Microchip Technology Inc., "Low Quiescent Current, PFM/PWM Synchronous Boost Regulator with True Output Disconnect or Input/Output Bypass Option", MCP16251/2, Jun. 23, 2016, 32 pp.

International Search Report and Written Opinion from International Application No. PCT/US2022/070816, mailed May 20, 2022, 13 pp.

Response to Communication Pursuant to Rules 161(1) and 162 EPC dated Dec. 7, 2023, from counterpart European Application No. 22709543.7, filed May 30, 2024, 11 pp.

Notice of Intent to Grant and Text Intended to Grant from counterpart European Application No. 22709543.7 dated Jan. 27, 2025, 40 pp.

Office Action from counterpart Japanese Application No. 2023-574201 dated Feb. 4, 2025, 6 pp.

First Examination Report from counterpart Indian Application No. 202347079031 dated May 2, 2025, 7 pp.

Response to Office Action dated Feb. 4, 2025, from counterpart Japanese Application No. 2023-574201 filed May 23, 2025, 10 pp.

* cited by examiner

TRUE LOAD DISCONNECT RESET OF COMPUTING DEVICES

This application claims the benefit of U.S. Provisional Patent Application No. 63/195,373, filed 1 Jun. 2021, the entire contents of which is incorporated herein by reference.

BACKGROUND

Modern computing devices have become extraordinarily complex with compute domains, physical sensors, and power systems that operate asynchronously. Asynchronous compute and the unpredictability of user input may lead to usage scenarios that are difficult to anticipate and can lead to device faults (e.g., reboots, lockups, etc.). In some scenarios, it may be necessary to reset the computing device to remedy some faults.

SUMMARY

This disclosure generally relates to resetting a computing device. One reset technique may involve power cycling (e.g., turning off and then back on) a power supply (e.g., a power management integrated circuit (PMIC)) of the computing device. For instance, responsive to a physical power button of the computing device being pressed for longer than a specified amount of time, a controller of the computing device may initiate a power cycling of the power supply. However, if a fault occurs in the power supply, such a reset technique may be ineffective in remedying the fault. For instance, a fault in the PMIC may result in a device that may be completely unresponsive and cannot be used until the battery drains completely and the device is unplugged from any charging cables, which may take hours or days. Such a delay may be undesirable.

In accordance with one or more techniques of this disclosure, a computing device may be configured to perform a true load disconnect reset technique. For instance, a controller of a computing device may electrically disconnect, and then electrically re-connect, all power sources from the computing device. As one example, the controller may open switches connecting a battery of the computing device to a PMIC of the computing device. As another example, the controller may open switches connecting signal lines of a universal serial bus (USB) connection via-which the PMIC receives power. As such, the true load disconnect reset technique may be effective at remedying a large number of faults, including faults in the PMIC, without having to wait for the battery to fully discharge and without having to unplug a charging cable.

As one example, a method includes, responsive to determining that a physical button of a mobile computing device has been pressed for longer than a first amount of time, resetting a PMIC of the mobile computing device; responsive to determining that the physical button of the mobile computing device has been pressed for longer than a second amount of time that is longer than the first amount of time, electrically disconnecting, at a first time, power sources from the mobile computing device; and electrically reconnecting, at a second time that is after the first time, the power sources to the mobile computing device.

As another example, a mobile computing device includes a PMIC configured to supply power to components of the mobile computing device; a physical button; and a controller configured to: reset, responsive to determining that the physical button has been pressed for longer than a first amount of time, the PMIC; electrically disconnect, responsive to determining that the physical button of the mobile computing device has been pressed for longer than a second amount of time that is longer than the first amount of time, at a first time, power sources from the mobile computing device; and electrically reconnect, at a second time that is after the first time, the power sources to the mobile computing device.

The details of one or more examples are set forth in the accompanying drawings and the description below. Other features, objects, and advantages will be apparent from the description and drawings, and from the claims.

DETAILED DESCRIPTION

Figure 1:
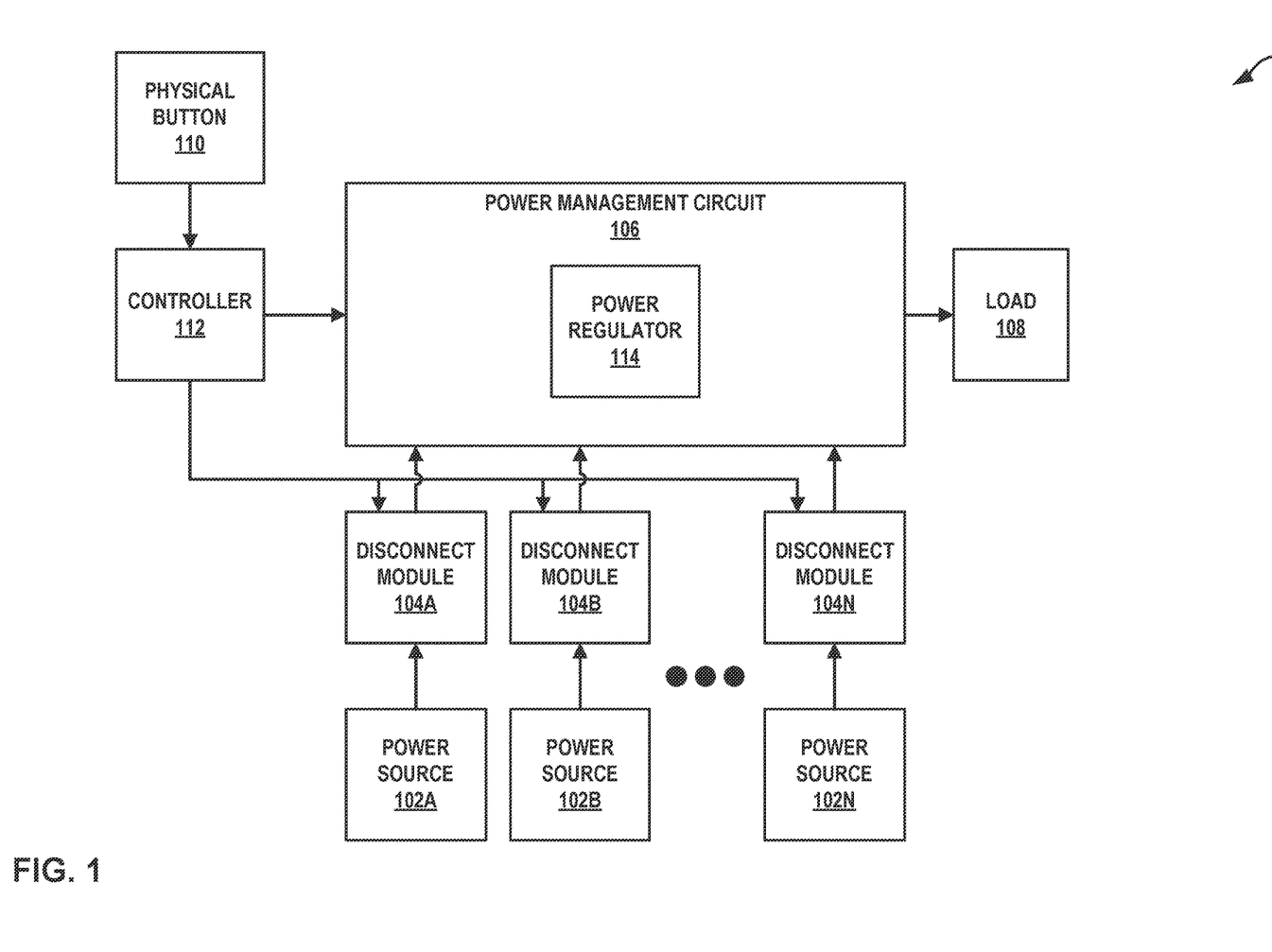
FIG. 1 is a conceptual diagram illustrating a device that includes a true load disconnect, in accordance with one or more techniques of this disclosure.

FIG. 1 is a conceptual diagram illustrating a device that includes a true load disconnect, in accordance with one or more techniques of this disclosure. As shown in FIG. 1, device 100 may include a plurality of power sources 102A-102N (collectively, "power sources 102), a plurality of disconnect modules 104A-104N (collectively, "disconnect modules 104"), power management circuit 106, load 108, physical button 110, and controller 112. Examples of device 100 include, but are not limited to, a mobile phone, a camera device, a tablet computer, a smart display, a laptop computer, a desktop computer, a gaming system, a media player, an e-book reader, a television platform, a vehicle infotainment system or head unit, or a wearable computing device (e.g., a computerized watch, a head mounted device such as a VR/AR headset, computerized eyewear, a computerized glove).

Each of power sources 102 may be any component capable of providing electrical power to other components of device 100, such as power management circuit 104. Examples of power sources 102 include, but are not limited to, batteries, solar panels, physical connectors, wireless charging receive coils, etc. For instance, power source 102A may be an internal battery of device 100, and power source 102B may be a charging cable connecting device 100 to an external power supply (e.g., a universal serial bus (USB) connection, such as a USB type-C connection).

Each of disconnect modules 104 may be configured to electrically disconnect a corresponding power source of power sources 102. For instance, disconnect module 104A may be configured to electrically disconnect power source 102A from power management circuit 106, . . . , and disconnect module 104N may be configured to electrically disconnect power source 102N from power management circuit 106. Disconnect modules 104 may be any component capable of causing an electrical disconnect between a power source and a component of device 100. For instance, a disconnect module of disconnect modules 104 may include one or more switches that, when opened, remove a current path between a power source of power sources 102 and power management circuit 106. Examples of disconnect modules 104 include, but are not limited to, switches (e.g., transistors), fuses (e.g., resettable fuses), and the like.

Power management circuit 106 may be configured to supply electrical power to various components of device 100, such as load 108. In some examples, power management circuit 106 may be a power management integrated circuit (PMIC). Power management circuit 106 may include one or more power supplies, such as power regulator 114, that supply power signals to load 108. Power management circuit 106 may be configured to source electrical power from a wide variety of sources. For instance, depending on context, power management circuit 106 may source electrical power from one or more of power sources 102. As one example, where no other power sources are available, power management circuit 106 may source electrical power from a battery of power sources 102.

As noted above, power management circuit 106 may include power regulator 114. Examples of power regulator 114 include, but are not limited to, switched mode power supplies (e.g., buck, boost, buck-boost, cuk, flyback, low-dropout, etc.). A voltage level of a power signal output by power regulator 114 may be adjustable. For instance, input power regulator 114 may output a DC power signal to load 108 at a set voltage level, such as a voltage level set by controller 112. In some examples, power regulator 114 may include multiple power supplies that supply power signals having different voltage levels (e.g., 5 volts, 3.3 volts, 1.8 volts, etc.)

Load 108 may represent various components of system 100 that consume power. Examples of load 108 include, but are not limited to, a display, a memory device, a storage device, a central processing unit (CPU), graphical processing unit (GPU), modem, digital signal processor (DSP), etc.

Controller 112 may include circuitry configured to control operation of various components of device 100. Examples of controller 110 include, but are not limited to, one or more digital signal processors (DSPs), general purpose microprocessors, application specific integrated circuits (ASICs), field programmable logic arrays (FPGAs), systems on a chip (SoC), or other equivalent integrated or discrete logic circuitry, or analog circuitry.

Physical button 110 may be a button of device 100 that is configured to receive user input. For instance, physical button 110 may be a so-called "power button" that is configured to receive user input to turn device 100 on or off. Input received via physical button 110 may be provided to various components of device 100, such as controller 112. For instance, controller 112 may receive an indication of a state of physical button 110 (e.g., pressed or not pressed).

For any number of reasons, faults may occur within device 100. For instance, asynchronous compute and the unpredictability of user input may lead to usage scenarios that are difficult to anticipate and can lead to faults within device 100 (e.g., reboots, lockups, etc.). In some scenarios, it may be necessary to reset device 100 to remedy some faults.

One reset technique may involve power cycling (e.g., turning off and then back on) a power supply (e.g., a power management integrated circuit (PMIC) of power management circuit 106 (e.g., power regulator 114). For instance, responsive to physical button 110 being pressed for longer than a specified amount of time, controller 112 may initiate a power cycling of the power supply of power management circuit 106. Such a cycling may cure many faults, especially those that occur in components of load 108.

However, if a fault occurs in power management circuit 106, such a reset technique may be ineffective in remedying the fault. For instance, a fault in power management circuit 106 may result in device 100 being completely unresponsive and unusable used until a battery drains completely and device 100 is unplugged from any charging cables, which may take hours or days.

In accordance with one or more techniques of this disclosure, device 100 may be configured to perform a true load disconnect reset technique. To perform the true load disconnect reset technique, controller 112 may electrically disconnect, and then electrically re-connect, all of power sources 102 from device 100 (e.g., without requiring actual physical disconnection). For instance, controller 112 may output signals to disconnect modules 104 that cause disconnect modules 104 to electrically disconnect power sources 102 from power management circuit 106. As one example, where power source 102A is an internal battery of device 100, controller 112 may cause disconnect module 104A to electrically disconnect the internal battery from power management circuit 106 (e.g., such that power management circuit 106 may cease receiving electrical power from the battery). As another example, where power source 102B is a USB cable carrying electrical energy from an external power supply to device 100, controller 112 may cause disconnect module 104B to electrically disconnect (e.g., open) signal lines of the USB connection (e.g., such that the external power supply ceases providing electrical power to device 100). As such, the true load disconnect reset technique of this disclosure may be effective at remedying a large number of faults, including faults in power management circuit 106, such that device 100 may be recovered without having to wait for a battery to fully discharge and without having to unplug a charging cable.

Figure 2:
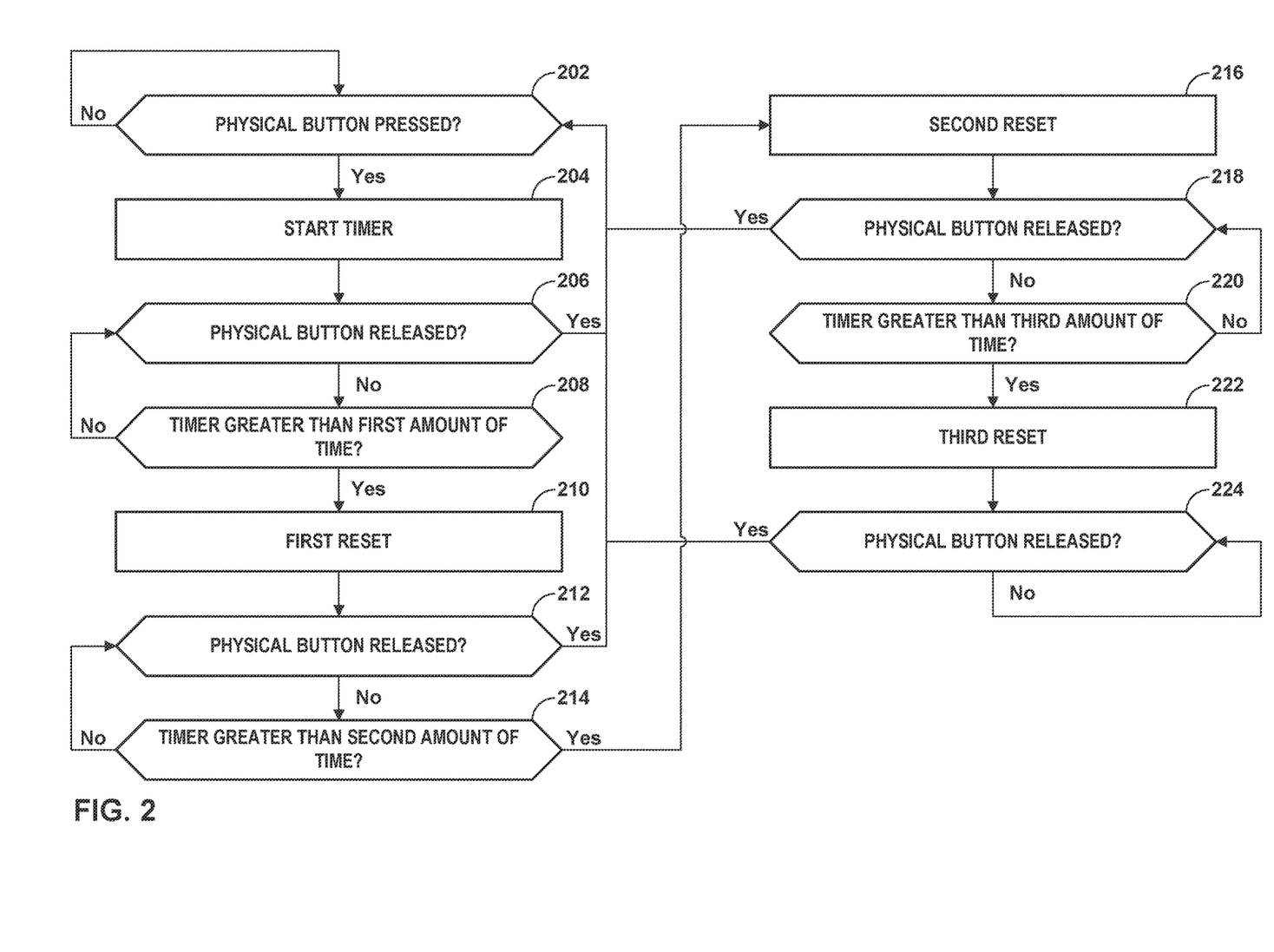
FIG. 2 is a flowchart illustrating a technique that includes various resets of a computing device, in accordance with one or more techniques of this disclosure.

FIG. 2 is a flowchart illustrating a technique that includes various resets of a computing device, in accordance with one or more techniques of this disclosure. For purposes of explanation, the technique of FIG. 2 is described in the context of device 100 of FIG. 1. However, other computing devices may perform the technique of FIG. 2.

Device 100 may determine whether a physical button is pressed (202). For instance, controller 112 may determine whether physical button 110 (e.g., a power button) is pressed. Responsive to determining that the physical button is not pressed ("No" branch of 202), device 100 may continue to monitor for pressing of the physical button (202).

Responsive to determining that the physical button is pressed ("Yes" branch of 202), device 100 may start a timer (204). For instance, controller 112 may start a timer (e.g., that counts up). Device 100 may monitor for release of the physical button (206) and determine whether a value of the timer is greater than a first amount of time (208). In some examples, the first amount of time may be less than or equal to 15 seconds (e.g., 5 seconds, 10 seconds, 15 seconds). Responsive to determining that the physical button is released prior to the timer being greater than the first amount of time ("Yes" branch of 206), device 100 may continue to monitor for pressing of the physical button (202) without performing any resets. Responsive to determining that the physical button is not released prior to the timer being greater than the first amount of time ("Yes" branch of 208), device 100 may perform a first reset technique (210).

To perform the first reset technique, device 100 may perform a warm reset. For instance, controller 112 may set output regulation levels of one or more power regulators of power management circuit 106 (e.g., power regulator 114) to default levels without disabling the one or more power regulators. For example, where a default output voltage level of power regulator 114 is 1.4 volts, controller 112 may cause power regulator 114 to output a power signal with a voltage level of 1.4 volts. In this way, where power management circuit 106 is a PMIC, controller 112 may be considered to reset a PMIC of device 100 responsive to determining that a physical button of device 100 has been pressed for longer than a first amount of time.

Device 100 may continue monitor for release of the physical button (212) and determine whether the value of the timer is greater than a second amount of time that is greater than the first amount of time (214). In some examples, the second amount of time may be less than or equal to 25 seconds (e.g., 15 seconds, 20 seconds, 25 seconds). Responsive to determining that the physical button is released prior to the timer being greater than the second amount of time ("Yes" branch of 212), device 100 may continue to monitor for pressing of the physical button (202) without performing any additional resets. Responsive to determining that the physical button is not released prior to the timer being greater than the second amount of time ("Yes" branch of 214), device 100 may perform a second reset technique (216).

To perform the second reset technique, device 100 may perform a cold reset. For instance, controller 112 may disable the one or more power regulators of power management circuit 106. For example, controller 112 may deactivate, and subsequently re-activate, power regulator 114. In this way, where power management circuit 106 is a PMIC, controller 112 may be considered to reset a PMIC of device 100 responsive to determining that a physical button of device 100 has been pressed for longer than a second amount of time.

Device 100 may continue monitor for release of the physical button (218) and determine whether the value of the timer is greater than a third amount of time that is greater than the second amount of time (220). In some examples, the third amount of time may be less than or equal to 35 seconds (e.g., 25 seconds, 30 seconds, 33 seconds, 35 seconds). Responsive to determining that the physical button is released prior to the timer being greater than the third amount of time ("Yes" branch of 218), device 100 may continue to monitor for pressing of the physical button (202) without performing any additional resets. Responsive to determining that the physical button is not released prior to the timer being greater than the third amount of time ("Yes" branch of 220), device 100 may perform a third reset technique (222).

In accordance with one or more techniques of this disclosure, to perform the third reset technique, device 100 may perform a true load disconnect procedure. For instance, device 100 may electrically disconnect, and subsequently reconnect, all power sources from device 100. Further details of one example of the true load disconnect procedure are discussed below with reference to FIG. 3.

Device 100 may continue monitor for release of the physical button (224). Until the physical button is released, device 100 may not move to the beginning of the reset sequence. As such, responsive to determining that the physical button has not been released since disconnecting the power sources, device 100 may refrain from re-disconnecting the power sources. Such a refraining may provide various benefits. As one example, by refraining from re-disconnecting the power sources until the physical button is released, the techniques of this disclosure may disallow rolling resets.

It is understood that, in some examples, one or both of the first reset technique and/or the second reset technique may be omitted. For instance, without performing one or both of the first or second reset techniques, responsive to determining that the physical button of the mobile computing device has been pressed for longer than the third amount of time, device 100 may perform the third reset technique.

Figure 3:
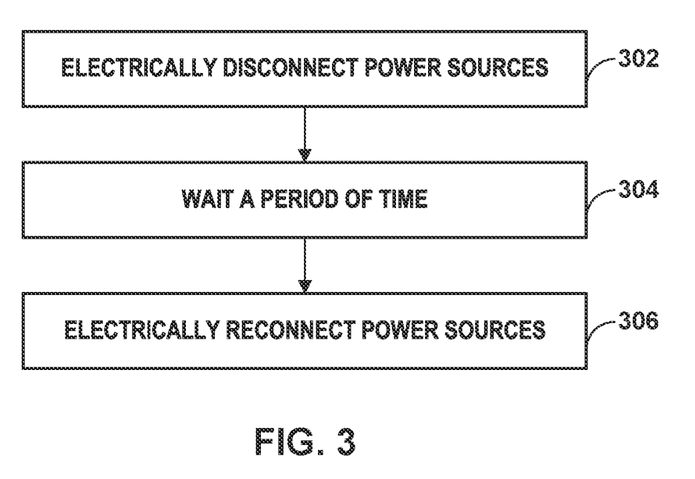
FIG. 3 is a flowchart illustrating a technique for a true load disconnect of a computing device, in accordance with one or more techniques of this disclosure.

FIG. 3 is a flowchart illustrating a technique for a true load disconnect of a computing device, in accordance with one or more techniques of this disclosure. For purposes of explanation, the technique of FIG. 3 is described in the context of device 100 of FIG. 1. However, other computing devices may perform the technique of FIG. 3. The technique of FIG. 3 may be performed as the third reset (222) of FIG. 2.

In general, the true load disconnect may result in a disconnect between power sources and power sinks of device 100. After all power sources are disconnected (e.g., electrically removed), the system is gracefully restarted (e.g., to provide user feedback that device 100 has been restarted).

Responsive to determining to perform the true load disconnect, device 100 may electrically disconnect all power sources (302). For instance, controller 112 may electrically disconnect a battery (e.g., open switches, such as field-effect transistors (FETs), connecting internally batteries to power sinks), disable charging paths (e.g., deactivate wireless charging), enable self-discharge of a system voltage (e.g., $V_{sys}$ self-discharge), electrically disconnect signal lines of USB connections (e.g., electrically disconnect configuration channel lines of a USB type-C connection (CC1, CC2)), etc.

Device 100 may wait a period of time (304) before electrically reconnecting the power sources (306). The period of time may be 2, 4, 6, 8, 10 seconds. After the period of time has elapsed, device 100 may electrically reconnect the power sources. For instance, controller 112 may electrically reconnect a battery (e.g., close switches, such as field-effect transistors (FETs), connecting internally batteries to power sinks), enable charging paths (e.g., reactivate wireless charging), disable self-discharge of a system voltage (e.g., $V_{sys}$ self-discharge), electrically reconnect signal lines of USB connections (the reconnection of configuration channel lines may cause an external power source to re-negotiate a power provision with device 100), etc. With the power sources electrically reconnected, device 100 may restart.

As discussed above, electrically disconnecting all present power sources when performing the true load disconnect may present one or more advantages. As one example, where a fault occurs in a PMIC of device 100, performing a warm reset or a cold reset may be insufficient to remedy the fault. In such a case, the fault may only be remedied by completely discharging a battery of device 100. Where device 100 receives power from one or more external sources (e.g., over a USB connection), the fault may never be remedied so long as power continues to be received. As such, by electrically disconnecting all power sources, the techniques of this disclosure enable remedying of a large number of faults without having to wait for a battery to be discharged and without having to physically unplug charging cables.

White described above as being user-initiated (e.g., via pressing of button for longer than specified amount of time), the true load disconnect technique of this disclosure is not so limited. As one example, device 100 may automatically trigger the true load disconnected in response to detecting certain faults. For instance, device 100 may include conductors that form a network connected to several components. Controller 112 may monitor this network and trigger performance of the true load disconnect (e.g., the technique of FIG. 3) when this network is pulled low (e.g., an open-drain signal).

The following numbered examples may illustrate one or more aspects of this disclosure:

Example 1. A method comprising: responsive to determining that a button of a mobile computing device has been pressed for longer than a first amount of time, resetting a power management integrated circuit (PMIC) of the mobile computing device; responsive to determining that the button of the mobile computing device has been pressed for longer than a second amount of time that is longer than the first amount of time, electrically disconnecting, at a first time, power sources from the mobile computing device; and electrically reconnecting, at a second time that is after the first time, the power sources to the mobile computing device.

Example 2. The method of example 1, wherein electrically disconnecting the power sources comprises: electrically disconnecting an internal battery of the mobile computing device; and responsive to determining that the mobile computing device is connected to an external power supply via a universal serial bus (USB) cable, electrically disconnecting signal lines of the USB connection.

Example 3. The method of example 2, wherein the USB cable remains physically connected to the mobile computing device between the first time and the second time.

Example 4. The method of example 2, wherein the PMIC includes one or more power regulators, wherein resetting the PMIC comprises setting output regulation levels of the one or more power regulators to default levels without disabling the one or more power regulators, the method further comprising: responsive to determining that the button of the mobile computing device has been pressed for longer than a third amount of time that is longer than the first amount of time and shorter than the second amount of time, disabling the one or more power regulators.

Example 5. The method of example 1, further comprising: responsive to determining that the button has not been released since the first time, refraining from re-disconnecting the power sources from the mobile computing device.

Example 6. The method of example 1, wherein the second amount of time is greater than or equal to 35 seconds.

Example 7. The method of example 1, wherein the first amount of time is less than or equal to 15 seconds.

Example 8. The method of example 1, further comprising: responsive to detecting occurrence of a fault at the mobile computing device, electrically disconnecting, at a third time, the power sources from the mobile computing device; and electrically reconnecting, at a fourth time that is after the third time, the power sources to the mobile computing device.

Example 9. A mobile computing device comprising: a power management integrated circuit (PMIC) configured to supply power to components of the mobile computing device; a button; and a controller configured to: reset, responsive to determining that the button has been pressed for longer than a first amount of time, the PMIC; electrically disconnect, responsive to determining that the button of the mobile computing device has been pressed for longer than a second amount of time that is longer than the first amount of time, at a first time, power sources from the mobile computing device; and electrically reconnect, at a second time that is after the first time, the power sources to the mobile computing device.

Example 10. The mobile computing device of example 9, wherein, to electrically disconnect the power sources, the controller is configured to: electrically disconnect an internal battery of the mobile computing device; and responsive to determining that the mobile computing device is connected to an external power supply via a universal serial bus (USB) cable, electrically disconnect signal lines of the USB connection.

Example 11. The mobile computing device of example 10, wherein the USB cable remains physically connected to the mobile computing device between the first time and the second time.

Example 12. The mobile computing device of example 10, wherein the PMIC includes one or more power regulators, wherein, to reset the PMIC, the controller is configured to set output regulation levels of the one or more power regulators to default levels without disabling the one or more power regulators, and wherein the controller is further configured to: disable, responsive to determining that the button of the mobile computing device has been pressed for longer than a third amount of time that is longer than the first amount of time and shorter than the second amount of time, the one or more power regulators.

Example 13. The mobile computing device of example 9, wherein the controller is further configured to refrain, responsive to determining that the button has not been released since the first time, from re-disconnecting the power sources from the mobile computing device.

Example 14. The mobile computing device of example 9, wherein the second amount of time is greater than or equal to 35 seconds.

Example 15. The mobile computing device of example 9, wherein the first amount of time is less than or equal to 15 seconds.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

What is claimed is:

1. A method comprising:
responsive to determining that a button of a mobile computing device has been pressed for longer than a first amount of time, resetting, by a controller of the mobile computing device, at a first time, a power management integrated circuit (PMIC) of the mobile computing device without disabling all power regulators of the PMIC;
responsive to determining that the button of the mobile computing device has not been released since the first time and has been pressed for longer than a second amount of time that is longer than the first amount of time, electrically disconnecting, by the controller of the mobile computing device, at a second time that is after the first time, all power sources from the mobile computing device; and
electrically reconnecting, by the controller of the mobile computing device, at a third time that is after the second time, the power sources to the mobile computing device.

2. The method of claim 1, wherein electrically disconnecting the power sources comprises:
electrically disconnecting an internal battery of the mobile computing device; and
responsive to determining that the mobile computing device is connected to an external power supply via a universal serial bus (USB) cable, electrically disconnecting signal lines of the USB connection.

3. The method of claim 2, wherein the USB cable remains physically connected to the mobile computing device between the second time and the third time.

4. The method of claim 1, wherein the PMIC includes one or more power regulators, wherein resetting the PMIC comprises setting output regulation levels of the one or more power regulators to default levels without disabling the one or more power regulators, the method further comprising:
responsive to determining that the button of the mobile computing device has been pressed for longer than a third amount of time that is longer than the first amount of time and shorter than the second amount of time, disabling the one or more power regulators.

5. The method of claim 1, further comprising:
responsive to determining that the button has not been released since the second time, refraining from re-disconnecting the power sources from the mobile computing device.

6. The method of claim 1, wherein the second amount of time is greater than or equal to 35 seconds.

7. The method of claim 1, wherein the first amount of time is less than or equal to 15 seconds.

8. The method of claim 1, further comprising:
responsive to detecting occurrence of a fault at the mobile computing device, electrically disconnecting, at a fourth time, the power sources from the mobile computing device; and
electrically reconnecting, at a fifth time that is after the third time, the power sources to the mobile computing device.

9. The method of claim 1, wherein electrically disconnecting all of the power sources from the mobile computing device comprises electrically disconnecting a battery and at least one other power source.

10. A mobile computing device comprising:
a power management integrated circuit (PMIC) configured to supply power to components of the mobile computing device;
a button; and
a controller configured to:
reset, at a first time, responsive to determining that the button has been pressed for longer than a first amount of time, the PMIC, without disabling all power regulators of the PMIC;
electrically disconnect, responsive to determining that the button of the mobile computing device has not been released since the first time and has been pressed for longer than a second amount of time that is longer than the first amount of time, at a second time that is after the first time, power sources from the mobile computing device; and
electrically reconnect, at a third time that is after the second time, the power sources to the mobile computing device.

11. The mobile computing device of claim 10, wherein, to electrically disconnect the power sources, the controller is configured to:
electrically disconnect an internal battery of the mobile computing device; and
electrically disconnect, responsive to determining that the mobile computing device is connected to an external power supply via a universal serial bus (USB) cable, signal lines of the USB connection.

12. The mobile computing device of claim 11, wherein the USB cable remains physically connected to the mobile computing device between the second time and the third time.

13. The mobile computing device of claim 10, wherein the PMIC includes one or more power regulators, wherein, to reset the PMIC, the controller is configured to set output regulation levels of the one or more power regulators to default levels without disabling the one or more power regulators, and wherein the controller is further configured to:
disable, responsive to determining that the button of the mobile computing device has been pressed for longer than a third amount of time that is longer than the first amount of time and shorter than the second amount of time, the one or more power regulators.

14. The mobile computing device of claim 10, wherein the controller is further configured to:
  refrain, responsive to determining that the button has not been released since the second time, from re-disconnecting the power sources from the mobile computing device.

15. The mobile computing device of claim 10, wherein the second amount of time is greater than or equal to 35 seconds.

16. The mobile computing device of claim 10, wherein the first amount of time is less than or equal to 15 seconds.

17. The mobile computing device of claim 10, wherein the controller is further configured to:
  responsive to detecting occurrence of a fault at the mobile computing device, electrically disconnect, at a fourth time, the power sources from the mobile computing device; and
  electrically reconnect, at a fifth time that is after the fourth time, the power sources to the mobile computing device.

* * * * *